US012650613B2

(12) United States Patent　　(10) Patent No.: US 12,650,613 B2

Panchenko et al.　　(45) Date of Patent: Jun. 9, 2026

(54) AIMING GLASSES

(71) Applicant: Valery Anatolyevich Panchenko, Tula (RU)

(72) Inventors: Valery Anatolyevich Panchenko, Tula (RU); Boris Valeryevich Panchenko, Tula (RU)

(73) Assignee: Valery Anatolyevich PANCHENKO, Tula (RU)

( * ) Notice: Subject to any disclaimer, the term of this patent is extended or adjusted under 35 U.S.C. 154(b) by 312 days.

(21) Appl. No.: 18/552,164

(22) PCT Filed: Mar. 31, 2022

(86) PCT No.: PCT/RU2022/000099
§ 371 (c)(1),
(2) Date: Sep. 22, 2023

(87) PCT Pub. No.: WO2022/211673
PCT Pub. Date: Oct. 6, 2022

(65) Prior Publication Data

US 2024/0176160 A1　　May 30, 2024

(30) Foreign Application Priority Data

Apr. 2, 2021　(RU) ................................. 2021109173

(51) Int. Cl.
*G02C 5/00*　　(2006.01)
*F41G 3/14*　　(2006.01)
*G02C 5/04*　　(2006.01)

(52) U.S. Cl.
CPC .............. *G02C 5/003* (2013.01); *F41G 3/14* (2013.01); *G02C 5/04* (2013.01); *G02C 2200/02* (2013.01)

(58) Field of Classification Search
CPC .................................. G02C 5/003; F41G 3/14

(Continued)

(56) References Cited

U.S. PATENT DOCUMENTS

| | | | | |
|---|---|---|---|---|
| 1,547,406 | A | * 7/1925 | Berling | .................. G02C 5/003 351/53 |
| 7,740,352 | B2 | * 6/2010 | Kopren | .................... A61H 5/00 351/45 |

(Continued)

FOREIGN PATENT DOCUMENTS

| | | |
|---|---|---|
| DE | 4010259 C2 | 11/1998 |
| RU | 2737350 C1 | 11/2020 |

OTHER PUBLICATIONS

International Search Report mailed Jul. 21, 2022 in International Application No. PCT/RU2022/000099.

*Primary Examiner* — Darryl J Collins

(74) *Attorney, Agent, or Firm* — Knobbe, Martens, Olson & Bear, LLP

(57)　　　ABSTRACT

Aiming glasses can be used for finding a line of aim when shooting firearms and pneumatic weapons, as well as in archery, billiards, golf, and curling. The aiming glasses include an optical part in which aiming guides can be moved and rotated relative to a frame in order to align the center of the guides with the visual axis of the eye, which passes through the center of the fovea and the target, and to vertically orient the guides. The results are improved at aiming accuracy and greater versatility of the aiming glasses for use in different types of sport. A further technical result is that of enabling a sportsperson to cultivate a reproducible afterimage of the aiming guides at the start of a line of aim.

6 Claims, 2 Drawing Sheets

(58) Field of Classification Search
USPC ............................................................. 351/53
See application file for complete search history.

(56) References Cited

U.S. PATENT DOCUMENTS

| 2002/0171806 A1* | 11/2002 | Baumgarten | ............ | A61B 3/11 |
| | | | | 351/227 |
| 2020/0103674 A1 | 4/2020 | Rosende | | |
| 2022/0019090 A1* | 1/2022 | Lee | ........................ | G02C 7/021 |

* cited by examiner

AIMING GLASSES

Priority and cross reference to related applications This application is the U.S. National Phase Application under 35 U.S.C. § 371 of International Application No. PCT/RU2022/000099, filed Mar. 31, 2022, designating the U.S. and published as WO 2022/211673 A1 on Oct. 6, 2022, which claims the benefit of Russian Application No. RU 2021109173, filed Apr. 2, 2021. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to aiming glasses and may be used for establishing a line of aim when shooting firearms or pneumatic weapons, as well as in archery, billiards, golf, curling, bowling, and darts.

BACKGROUND

When taking aim, the physiological process of vision is as follows.

The highest visual ability rests with the yellows spot present on the retina of the eye, which has a diameter of approximately 5 mm and is a region responsible for clear vision, while a pit in the yellow spot has a diameter of approximately 0.4 mm and is the clearest vision region—ref. to www.traditio.wiki *Yellow Spot* (Mig Version) Tradition, para. 1, 2. With increasing distance from the pit center towards the yellow spot periphery, vision becomes less clear gradually, without any sharp cutoff, thus enabling central vision.

The visual axis of an eye passes through the center of the pit in the yellow spot and the crystalline lens center towards a target. The optic axis of the eye passes through the crystalline lens center and the pupil center perpendicularly to the surfaces thereof. A gamma angle ($\gamma$), formed between the visual axis and the optic axis, is of −3 to +8 degrees, in most people typically being +5 degrees, while being 0 degrees in a small number of people, i.e. the axes are coaxial with each other—ref. to www.eyepress.ru. *Po kakomu napravleniyu smotrit glaz* (*The Direction An Eye is Gazing*), para. 7, FIG. 1, 2, Yu. V. Kuznetsov. Where the gamma angle is large, the eye visual axis crosses the cornea at a point offset from the pupil center by up to 0.5 mm. This increases the astigmatism (distortion of the observed image—ref. to www.medbe.ru *Ponyatiye o klinicheskoy refraktsii* (*The Concept of the Clinical Refraction*), para. 2, www.chnow.ru 3.6.8. A path of a ray that has passed through a lens at an arbitrary angle relative to the main optic axis thereof. A converging lens, FIG. 3, at the top. Where gamma angles are larger than 0 degrees, an eye's physiological ability to take aim is reduced.

When taking aim, an athlete is neither aware, nor has a physiological sense of the exact position of the pit center in the yellow spot, as his/her eyeball does not have any means to control its position: such means were not naturally developed, because humans had not needed them before small weapons were created. One can see his/her own pupil only in the mirror. As a result, the athlete sees only the external portion of the line of aim and the target, while being unaware of the exact position of the line of aim inner portion origin, i.e. the pit center in the yellow spot. That is why the line that can be drawn between a visible target and the non-visible center of the pit in the yellow spot will be merely tentative, while the line of aim will be likely to deviate from the center of the pit in the yellow spot to the yellow spot (the yellow sport surface area is ~100 times larger than that of the pit in the yellow spot, thus enabling central vision). This can be verified experimentally, i.e. if one attempts to draw a line from a visible point, e.g. on a wall, (from a target) to the center of the pit in the yellow spot, multiple lines will be visible, but it will be impossible to determine the one coming to the center of the pit in the yellow spot. The same occurs when to drawing a line back to the target.

There is known a diopter sight—ref. to www.sunghts-review.ru, *Dioptricheskiy pritsel i yego ispolzovaniye* (*A Diopter Sight and Use Thereof*), a picture. It comprises interim targets in the form of an orifice plate (a rear sight) and a front sight to be lined up on the line of aim with the center of the pit in the yellow spot and the target.

The center of the pit in the yellow spot can be precisely and reflexively set individually on each of the three points (the target, the front sight or the rear sight)—ref. to www.ru.wikipedia.org *Dvizheniye glaz (Ocular Movement)*, Wikipedia, para. 3. Three distinct lines come simultaneously from three non-coincident points to three distinct points on the eye retina.

In order to establish a single line of aim based on the three points, the visual axis is moved, the head and the weapon, with its interim targets, are tilted in a vertical plane and in a horizontal plane, including in a manner to prevent canting—ref. to www.shooting-ua.com *Svalivaniye oruzhiya (Canting)*, FIG. 331.

If any of the three points is misaligned with the center of the pit in the yellow spot, the aiming will not be accurate. For example, if the front sight deviates from the center of the pit in the yellow spot by 0.2 mm (towards the pit edge) and the distance between the pit in the yellow spot and the front sight is 800 mm, the bullet deviation will be 0.2 mm for every 800 mm of the distance to the target. In biathlon, where the shooting distance is 50 m, the bullet deviation from the target center will be 50 m/800 mm×0.2 mm=12.4 mm. For a target of 45 mm in diameter, the allowable deviation from the center of the target is 22.5 mm. That is, 12.4 mm/22.5 mm×100%=50.5% of the allowable deviation of the bullet will be due to the line of aim deviation from the center of the pit in the yellow spot by 0.2 mm, and, if the deviation is 0.37 mm, the bullet will not come within the target gauge.

Due to the uncertainty of position of the center of the pit in the yellow spot and, therefore, uncertainty of position of the visual axis origin, an athlete, when taking aim, has to control the visual axis and to establish the line of aim by an indirect method, i.e. based on the visible disposition of the interim targets and the target, which requires years of training.

Furthermore, the central vision has the highest acuity (clarity) at a visual angle not larger than 2.5 degrees. Together with the peripheral vision, the vertical field of vision amounts to 150 degrees; accordingly, the vertical aiming plane may not be established without using the peripheral vision.

Thus, the diopter sight has the following disadvantages:
  the athlete is physiologically unaware of where, at the time of aiming, the invisible center of the yellow spot pit is disposed relative to the line of aim: to the left or right, or below, or above it;
  the indirect method of checking positions of the center of the pit in the yellow spot and the visual axis, both invisible to the athlete, relative to the line of aim, i.e. based on relative positions of the visible rear sight, front sight and target;

lack of visible vertical and horizontal lines providing the orientation basis for the central and the peripheral vision for establishing the vertical aiming plane similar to an aiming reticle of an optical sight—ref. to www.y-andex.ru, Pictures. An aiming reticle;

non-versatility in use: the diopter sight may not be used in other sports for drawing the line of aim.

There is known a universal method for aiming in different types of sports by drawing lines of aim through interim targets (similar to the interim rear sight and front sight in a diopter sight). For example, in billiards, a cue stick, a cue ball and an object ball are used to this end—ref. to www.iknigi.net. *Azbuka bilyarda* (*The ABC of Billiards*), Page 5, FIG. 39, A. L. Loshakov. It is done by using a granite stone in curling, a dart in darts, a string and an arrow in archery, etc.

The feature common to various sports is that the aiming eye, the interim targets and the target are disposed at different heights with respect to each other, but in the same vertical aiming plane.

In billiards, for example, the aiming eye and the visible portion of the cue stick, the cue ball and the object ball are disposed at different heights relative to the table surface and not on one and the same straight line. A line of aim is drawn between them, the line varying in height in a common vertical aiming plane, which requires using both the central and the peripheral vision.

Disadvantages of this aiming method replicate those of the analogous solution:

the athlete is physiologically unaware of where, at the time of aiming, the invisible center of the yellow spot pit (the visual axis origin) is disposed;

the indirect method of checking positions of the center of the pit in the yellow spot and the visual axis, both invisible to the athlete, relative to the line of aim, i.e. based on relative positions of the visible interim targets and the target;

lack of visible vertical and horizontal lines constituting aiming guides for the central vision and the peripheral vision for establishing the line of aim and the vertical aiming plane.

There is known a 'Contact Lens for Aiming and Device for Installing Thereof', RU 2737350. It comprises an optical portion, i.e. a contact lens having an aiming guide in the form of an aiming reticle, the aiming reticle elements being oriented, during the installation, in a vertical plane, the aiming reticle center being aligned with the eye visual axis passing through the center of the pit in the yellow spot and the target. The installation device comprises a carrier having a light-permeable zone and an external aiming guide having a point on a vertical line disposed at a distance from the carrier.

Such disposition of the aiming reticle on the contact lens at the line of aim origin at a distance shorter than the eye focal distance enables seeing the line of aim origin, objectively determining the disposition of the center of the pit in the eye's yellow spot and the line of aim origin relative to the target, and controlling the eye visual axis based on the gamma angle.

The disadvantages are as follows:

insufficient positional stability of any contact lenses, including a contact lens for aiming, on the cornea during blinking. This causes deviation of the aiming reticle center position relative to the center of the pit in the yellow spot and disturbance of the aiming reticle vertical orientation. As a result, the contact lens has to be re-installed every 5 to 10 minutes;

the contact lens has to be put on the eye in order to take aim, which is not an acceptable procedure for certain athletes.

There are known glasses for measuring pupillary distance in a patient—ref. to www.ochki.kom, *Razlichnye metody izmereniya mezhzrachkovogo rasstoyaniya* (*Various Methods for Pupillary Distance Measuring*), FIG. 3, determining the gamma angle.

The glasses comprise a frame without earpieces, but with a grip to be used by an ophthalmologist, an optical part in the form of lenses to be moved relative to each other by the ophthalmologist in front of the patient's face disposed vertically and uprightly; the lenses are provided with a vertical and a horizontal intercrossing lines, the centers where the lines cross each other being the reference points for determining the pupillary distance.

The description neither discloses, nor implies using said glasses for aiming, since it is impossible due to the following disadvantages:

when in their sport stance during aiming, different athletes, and even more so in different sports, have their heads and, accordingly, the glasses (glass frames) worn by them, disposed differently in the vertical direction. Different head tilts and turns to the right, left, forward or backward are due, inter alia, to athletes' different physiological features and individual preferences. For example, they include the dominant eye being the left or the right eye, the athlete being a left-handed or a right-handed person, different cervical vertebra lengths, different heights of the left and the right eyes relative to the weapon when the athlete is in stance for aiming. Ref., for example, to www.vandex.ru: Shooting, a front view of an athlete, pictures, U.S. Pat. No. 10,473,430, FIG. 5, www.Yandex.ru: Snooker, a front view of an athlete, pictures.

every time after being taken off or put on, the glasses take a different new position with respect to the athlete's head, the position being different from the previous one in all coordinates by 1 to 2 mm. Accordingly, the aiming guides every time take a new position relative to the center of the pit in the yellow spot and in the vertical plane. Thus, every time the new position of the aiming guides has to be corrected, as the center of the pit in the yellow sport must be aligned with the target with the accuracy of 0.1 mm, (Description, sheet 2, para. 4).

Thus, when one is standing in a sport stance for aiming and tilting one's head, the vertical lines on the lenses of the pupillary distance measurement glasses are no longer vertical and may not be used for establishing the vertical aiming plane.

There are known glasses—ref. to www.zen.yandex.ru: James Bond Glasses with Projection/Vlog/. They are equipped with an integrated projector and Bluetooth in communication with a smart phone, information from the smart phone being displayed on the glasses' lenses.

The description neither discloses, nor implies using said glasses for aiming, as they have the following disadvantages:

no provision is made for producing visible aiming guides on the glasses' lenses;

no technical capability is provided for an athlete to control the movement and rotation (tilting) of the aiming guides on the lenses for aligning them with the center of the pit in the yellow spot and orienting them in the vertical plane to suite his/her sport stance;

no provision is made for using an external aiming guide disposed at a distance, without which an athlete is unable to align with each other the center of the pit in the yellow spot, the aiming guides and the target, such as in the vertical plane, RU 2737350, Claims, Claim 10.

If said disadvantages are overcome by means unknown in the art, a projector and Bluetooth in communication with a smart phone may be utilized in aiming glasses.

The closest technical solution are glasses for aiming when shooting firearms, U.S. Pat. No. 10,473,430, [0006] para. 5, [0008] para. 1, FIG. 1.5.

The optical part of the glasses is configured in the form of an opaque patch attached to the glasses having aiming guides in the form of apertures.

It is disadvantageous in that the center of the optical part aperture in the opaque patch attached to the glasses is aligned with the eye pupil center, about which the Patent Specification says in para. [0044], Sentence 6: 'The user's eyes have the pupils (not shown) aligned along sight lines 1206 through the apertures of the optical devices 1204. A line of sight 1206A may begin at the pupil . . . '.

Accordingly, at a gamma angle not equal to 0 degrees, the center of the aperture in the optical part is misaligned with respect to the eye visual axis. Such misalignment results in inaccurate aiming.

The description does not contain the following terms essential for accurate aiming: 'eye visual axis', 'center of the pit in the yellow spot', 'gamma angle', 'vertical aiming plane'.

The majority of disadvantages of the prior art remain and new disadvantages are added:

the athlete is physiologically unaware of where, at the time of aiming, the invisible center of the yellow spot pit (the visual axis) is disposed;

the indirect method of checking positions of the center of the pit in the yellow spot and the visual axis, both invisible to the athlete, relative to the line of aim, i.e. based on relative positions of the visible rear sight, front sight and target;

the peripheral vision is blocked by the opaque patch;

inability to move the opaque patch on the lens for an athlete to accurately and independently align with each other the center of aperture in the patch and the visual axis and to vertically orient them;

non-versatility in use, as the glasses may not be used in other sports, where both the central vision and the peripheral vision are required.

SUMMARY

The objects to be achieved by the invention are as follows:

to develop aiming glasses enabling an athlete to check the positions of the center of the pit in the eye yellow spot and of the line of aim origin relative to the target irrespective of the specifics of his/her head spatial position, such as in different types of sports;

to improve positional stability of aiming guides relative to the center of the pit in the yellow spot.

The problem encountered in achieving the above object consists in determining the necessary types (degrees of freedom) and in providing mechanisms for moving the aiming guides relative to the frame of the glasses.

Technical results to be provided by the invention are as follows:

improved aiming accuracy;

greater versatility of the aiming glasses for use in different types of sports.

A further technical result is enabling an athlete to cultivate, at the line of aim origin, a reproducible afterimage of an aiming guide, ref. to www.ru.wikipedia.ru, *Posleobraz* (*Afterimage*).

Said technical results are achieved in prior art aiming glasses comprising an optical part having aiming guides and a frame, characterized in that the optical part is configured to be moved and rotated relative to the frame in order to align the center of the aiming guides with the eye visual axis passing through the center of the pit in the eye yellow spot and a target, and to vertically orient the aiming guides.

Furthermore, the optical part is configured in the form of movable and rotatable lenses provided with aiming guides.

Moreover, the aiming guides are configured in the form of an aiming reticle on the lens or an X-shaped slot in the lens.

Moreover, the frame is provided with grooves for lens movement and rotation.

Moreover, the movable and rotatable lenses and the frame are provided with magnets.

Furthermore, the optical part is configured in the form of movable and rotatable sliding members provided with aiming guides.

Moreover, the aiming guides are configured in the form of lines.

Moreover, the frame is provided with grooves for sliding member movement and rotation.

Furthermore, the optical part is configured in the form of movable and rotatable luminous aiming guides on non-movable lenses.

Moreover, the luminous aiming guides are configured in the form of an aiming reticle.

Moreover, the luminous aiming guides are produced by movable and rotatable light emitters disposed on the arms of the glasses.

Moreover, the light emitter movement and rotation device is configured in the form of a variety of Hooke's joint.

The essential feature 'the optical part' is expressed in a generic form because it encompasses various implementations of the optical part and the lens: a non-dioptric lens having aiming guides, sliding members having aiming guides without lenses, luminous aiming guides produced by light emitters on lenses, such as dioptric lenses. However, all implementations provide the same technical results as stated above.

The essential feature 'configured to be moved and rotated relative to the frame' is expressed in a generic form because it encompasses movements of the aiming guides by various lens movement and rotation mechanisms, movements of the sliding members without lenses, movements of the luminous aiming guides relative to stationary lenses.

The essential feature 'the aiming guides' is expressed in a generic form for all implementations, as it encompasses multiple types of different structures, shapes and arrangements, for example, various aiming reticles—ref. to www-.vandex.ru, *Pritselnaya setka* (*An Aiming Reticle*), pictures. The aiming guides may also be implemented in other similar forms, such as in the form of an X-shaped slot in the lens, in the form of lines on the sliding members, in the form of luminous aiming guides on lenses' surfaces.

The essential feature 'center of the aiming guides' is expressed in a generic form, as, whatever the form of the aiming guides, they are disposed symmetrically with respect to a point (center) common to them or on the same vertical line with the center through which the vertical aiming axis passes.

The essential feature 'to vertically orient'/'vertical orientation' is expressed in a generic form, as it encompasses disposition of at least some of the aiming guides in the vertical plane irrespective of how the head and the frame of the glasses are disposed, to which end the aiming guides must be rotatable (tiltable) to one or other side relative to the frame of the glasses.

The combination of essential features 'the optical part is configured to be moved and rotated relative to the frame in order to align the center of the aiming guides with the eye visual axis passing through the center of the pit in the eye yellow spot and a target and to vertically orient the aiming guides' is in a cause-and-effect relationship with the technical results of 'improved aiming accuracy' and 'greater versatility of the aiming glasses for use in different types of sports', as:

the ability thus provided for the optical part to move and rotate enables the center of the pit in the eye yellow spot and the visual axis to be precisely aligned with the center of the aiming guides and the target, and enables vertically orienting the aiming guides in order to establish a vertical aiming plane;

Moreover, the aiming guides in the glasses are disposed at the line of aim origin, thus enabling the athlete to see the origin and the entire line of aim up to the target and to precisely align interim targets and the target with the line of aim based on the gamma angle. Moreover, movements of the visual axis are controlled and the line of aim is established not by an indirect method based on external interim guides; as a matter of fact, two interim targets are aligned with an already established visible line of aim. In this way, the aiming accuracy is improved.

the aiming glasses may be used in other sports, where a line of aim and a vertical aiming plane are to be established. In this way, a greater versatility in use is provided.

Moreover, the center of the pit in the eye yellow spot and the visual axis are pre-aligned with the center of the aiming guides and the target, and the aiming guides are vertically oriented by using, for example, an external aiming guide comprising an external point on a vertical line disposed at a distance from the athlete (not shown in the figure)—ref. to RU 2737350, Claim 10, or with the use of ophthalmological devices referred to in RU 2737350—ref. to Specification, page 4, para. 2, and then aiming is done in real-life conditions.

This combination of essential features is also in a cause-and-effect relationship with a further technical result, unknown in the prior art, i.e. 'enabling an athlete to cultivate, at the line of aim origin, a reproducible afterimage of an aiming guide', because, as a result of the aiming guides being disposed on the lenses of the aiming glasses at a distance shorter than the eye focal distance and in combination with long-term (3 to 6 months) use of the aiming glasses at practice, the athlete, even without the aiming glasses, begins seeing (discerning), at the visual axis origin, between the upper and the lower eyelids, near the cornea, an afterimage of a semi-transparent vertical line throughout the field of vision. Moreover, the vertical line thus established does not disappear with changing the eye focus along the visual axis, but allows seeing therethrough and aligning therewith the interim targets, the entire line of aim and the target. Moreover, the vertical line thus established is aligned and stably connected with the center of the pit in the yellow spot and is controlled by motions of the center of the pit in the yellow spot, due to the vertical line being disposed at a minimal distance therefrom. As a result of long-term use of the aiming glasses, the afterimage remains for several days even when aim is taken without the aiming glasses, after which the afterimage gradually 'fades away' and periodic training sessions with the use of the aiming glasses are required. Such disposition of the afterimage thus cultivated at the visual axis origin is substantially different from the prior art afterimage—ref. to www.ru.wikipedia.ru, *Posleobraz* (*Afterimage*), which is disposed at a distance from the eye at an external visible end of the visual axis, e.g. on a wall, and, as such, is not acceptable either for precise visible alignment with the center of the pit in the yellow spot or for establishing a visible origin of the line of aim. The aiming reticle afterimage thus cultivated provides a temporary possibility to achieve the stated technical results without the aiming glasses, such as in competition.

Moreover, an aiming reticle afterimage at the line of aim origin with vertical orientation is also cultivated by using a contact lens for aiming according to RU 2737350, Claim 1. However, even in case of joint movement of an eyeball together with the contact lens and aiming guides, long-term training sessions are required.

DETAILED DESCRIPTION

The details demonstrating that the aiming glasses can be produced and operated in all implementations such as to produce the stated technical results and the further technical result are as follows.

Figure 1:
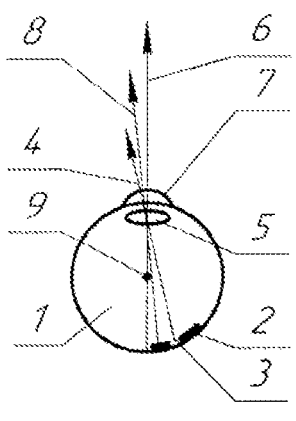
FIG. 1 schematically shows aiming with a right eye, wherein the eye visual axis is offset by a gamma angle of 5 degrees from the eye's optic axis, while the line of aim deviates from the center of the pit in the yellow spot onto the yellow spot, thus causing the aiming to be inaccurate (the yellow spot dimensions are enlarged for clarity), top view, scale 1:1.

The aiming scheme with a line of aim deviating from the pit in the yellow spot, as shown in FIG. 1, comprises an eyeball 1, a yellow spot 2 including a pit 3, a visual axis 4 passing through the center of the pit 3 in the yellow spot 2 and the crystalline lens 5 center, an optic axis 6, a cornea 7, a line 8 of aim not aligned with the visual axis 4, i.e. the aiming is inaccurate, and the rotation center 9 of the eyeball 1.

Figure 2:
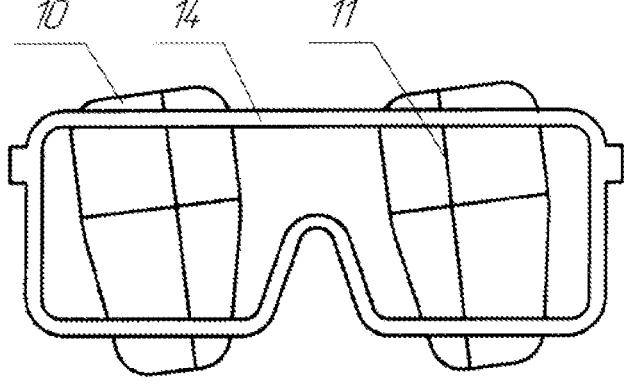
FIG. 2 shows an implementation of the aiming glasses, wherein 'the optical part is configured in the form of movable and rotatable lenses provided with aiming guides', wherein 'the aiming guides are configured in the form of an aiming reticle', front view, scale 1:1.5.
Figure 3:
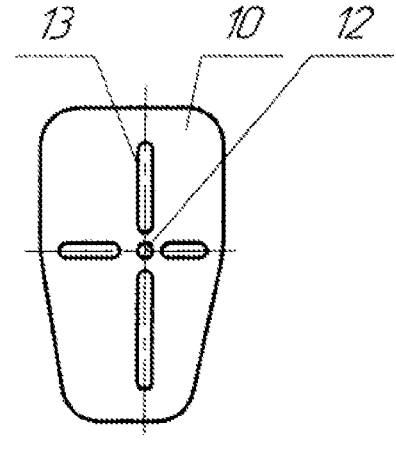
FIG. 3 shows a lens, wherein 'the aiming guides are configured in the form of an X-shaped slot in the lens', front view, scale 1:1.5.
Figure 4:
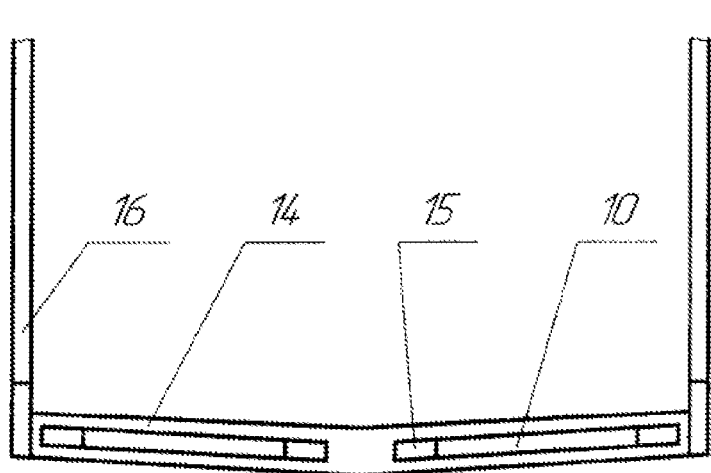
FIG. 4 shows the aiming glasses, top view, scale 1:1.5.

In an implementation of the essential feature 'the optical part is configured in the form of movable and rotatable lenses provided with aiming guides', wherein 'the aiming guides are configured in the form of an aiming reticle', as shown in FIGS. 2, 4, the aiming glasses comprise the lenses 10 made of a plastic material, such as PET, having a 90% translucency and a thickness of 1 to 2 mm, or of artificial glass. There may be provided one lens 10 for the dominant eye or two lenses for both eyes. The lenses 10 are shaped asymmetrically in accordance with the shape of the field of vision for the left and the right eye with offset geometric centers. The aiming guides on the lens 10 are configured in the form of an aiming reticle 11 having a center 12 where a vertical and a horizontal lines cross each other, or in the form of an X-shaped slot 13 in the lens, as shown in FIG. 3. The horizontal line and the center 12 may be disposed higher or lower depending on the tilt of the head in a stance for aiming. The lens 10 is disposed at a distance shorter than the eye's front focal distance—ref. to www.glazamed.ru 5. *Opticheskaya sistema i refrakisiya glaza (The Optical System and Refraction of the Eye)*, para. 7. Thus, the athlete will see the aiming reticle 11 lines and the slot 13 edges unclear and blurred, but with even and discernible boundaries, like the boundaries of the masks and apertures according to U.S. Pat. No. 3,794,414, Specification, para. 5, U.S. Pat. No. 5,980,040, Specification, Summary, para. 3. With a small thickness of 0.5 to 1.2 mm of the aiming reticle 11 lines, light rays affected by diffraction—ref. to www.ens.tru.ru, *Difraktsiya Frenelya ot prosteishikh pregrad. Difraktsiya of diska (Fresnel Diffraction from Primary Obstacles. Diffraction from a Disk)*, FIG. 9.4—go past the aiming reticle 11 lines, converge behind them and are visually perceived as 'passing through the lines'. Herein, the aiming reticle 11 lines become 'semi-transparent' with even, discernible boundaries, which is sufficient to see and visualize the space, the interim targets and the target disposed behind the line. The aiming reticle 11 line thickness dimensions of 0.5 to 1.2 mm have also been selected taking into account that, if the lens is disposed at a distance shorter than the eye's focal distance, the aiming reticle 11 elements become visible, if their dimension is larger than 0.5 mm (RU 2444334, Claim 2). The lines may have an increased or reduced thickness which may be determined by experiment and taking into account personal characteristics of the athlete's vision. Moreover, the X-shaped slot 13 is configured to have a width of 0.5 to 1.2 mm, the visual axis passing between the slot edges.

Figure 5:
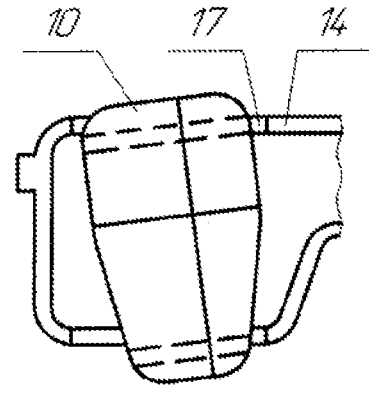
FIG. 5 shows an implementation of the aiming glasses, wherein 'the movable and rotatable lenses and the frame are provided with magnets', front view, scale 1:1.5.

The aiming reticle 11 is produced on an outer or an inner side of the lens 10 with the use of prior art paints of various colors, such as a paint containing a vinyl copolymer and a dye—ref. to Patent RU 2074409, Specification, para. 1, or a laser—ref. to Patent RU 2444334, description of FIG. 5, Step 1, or machining; herein, the machined cross-section may be triangular, rectangular or semicircular in profile (not shown in the figure) and may be of various translucencies, such as painted.

The aiming glasses further comprise a frame 4 provided with grooves 15 for movable and rotatable lenses 10 and arms 16 provided with earpieces. Furthermore, the grooves 15 have pasted therein flannel strips (not shown in the figure) to secure the lenses 10, while allowing them to be moved, or the groove 15 may be configured to have a width smaller than the lens 10 thickness by 0.1 to 0.2 mm to provide slight compression. The frame 14 may be flat or may have a radius. The frame 14 and the lens 10 may be enlarged in height depending on the tilts of the head in stances for aiming in different types of sports. To hold the frame 14 stationary on the head during the lens 10 movements, the arms 16 may be provided with an elastic retention strap—ref. to www.tula.v-grote.ru *Rezinka dlya ochkov ESS Crosbow (An Elastic Strap for ESS Crosbow Glasses)*.

The aiming glasses comprising the lens 10 are used as follows.

An athlete puts on the glasses, assumes a stance for aiming in front of an external aiming guide of any type—ref. to RU 2737350, Claims, Claim 10—disposed at a distance. The athlete then looks at an external point of the external aiming guide, then, with his/her hand, moves and rotates the lens 10 to the right/left and/or up/down until the center of the pit 3 in the yellow spot 2 and the center 12 are aligned with the external point on the external aiming guide in order to align the visual axis 4 with the line 8 of aim, then orients the aiming guides 11 along the vertical line of the external aiming guide.

Moreover, the athlete makes complex micro- and mini-motions with his/her eyeball 1, mini-turns, tilts and moves with his/her head and weapon within the limits of his/her sport stance and according to his/her personal preferences to determine the final positions of and to precisely align the center of the pit 3 in the yellow spot 2 with the line 8 of aim and the target. As a result, the athlete sees the aiming reticle at the origin of the line and the entire line 8 of aim on the visual axis 4 and sees the vertical aiming plane.

Similarly, the athlete aligns a presumed center of the X-shaped slot 13 with the target. Having aligned the center of the pit 3 in the yellow spot 2, e.g., with the center 12 of the aiming reticle 11 on the lens 10 and the external point on the external aiming guide, and having vertically oriented the aiming reticle 11 on the lens 10, the athlete may, with the use of the aiming glasses, take a real aim without an external aiming guide and, for example, fire a shot.

In this way, the above main technical results and, following long-term training, the above further technical result can be achieved.

Figure 6:
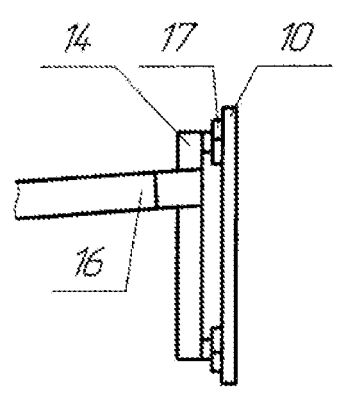
FIG. 6 shows a left side view of the same.

In an implementation of the essential feature 'the movable and rotatable lenses and the frame are provided with magnets', as shown in FIGS. 5,6, the aiming glasses comprise the lenses 10 having pasted, at their upper and lower portions, magnets 17 sized 3×30 mm and having a thickness of 0.5 to 1 mm—ref., for example, to www.mv-shop.ru *Samokleyushchiysya magnitnyi list. gibkiy (Self-Adhesive Magnetic Sheet, Flexible)* 200×300×0.7 mm, or, instead of the magnets, they may have pasted thereto a metal strip 0.3 mm thick (not shown in the figures). They further comprise a frame 14 having pasted to it, at its front side upper and lower portions, magnets 17 sized 3×45 mm; moreover, the magnets 17 are selected to have a minimum magnetizing force which is yet sufficient to hold the lenses 10, including during movements.

The aiming glasses provided with the lens 10 and the magnets 17 are used in a manner similar to that described for the preceding implementation comprising the grooves 15. Herein, the lenses 10 provided with the magnets 17 are attracted to the frame 14 provided with the magnets 17 and are capable of moving, rotating and aligning the center of the pit 3 in the yellow spot 2 with the center 12 of the aiming guides and with the target and allow for orienting the aiming guides 11 in the vertical plane.

In this way, the above main technical results and, following long-term training, the above further technical result can be achieved.

Figure 7:
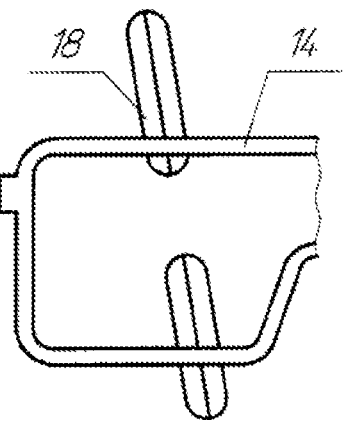
FIG. 7 shows an implementation of the aiming glasses, wherein 'the optical part is configured in the form of movable and rotatable sliding members provided with aiming guides', wherein 'the aiming guides are configured in the form of lines', front view, scale 1:1.5.

In an implementation of the essential feature 'the optical part is configured in the form of movable and rotatable sliding members provided with aiming guides', wherein 'the aiming guides are configured in the form of lines', as shown in FIG. 7, the aiming glasses comprise sliding members 18 made, for example, from the transparent plastic material Palclear PVC—ref. to www.aiuk-grupp.ru—having a thickness of 1 to 1.5 mm, the width of 8 mm, and a length of 35 to 38 mm, projecting from the frame for contact with fingers during movements, such as vertical movements. The aiming guides are configured in the form of lines. The upper and lower sliding members 18 may be moved independently from each other and be disposed on the same straight line. The frame 14 is provided with grooves 15 for the movable and rotatable sliding members 18. Herein, the grooves 15 have pasted therein flannel strips (not shown in the figure). When the sliding members 18 are shifted to opposite sides, there is no visible line connecting them, but only the ends of the sliding members' 18 lines of aim are visible. Moreover, no visible horizontal line is provided. In this case, it is much more complicated to establish a line of aim and vertically orient the aiming guides. However, this implementation of the essential feature is used for the athletes having a higher level of competence following training with the use of the glasses provided with the lenses 10.

Furthermore, the sliding members 18 may have a shorter length, i.e. 15 to 20 mm (not shown in the figures) and may be connected to the frame of the glasses in the grooves 15 or via the magnets 17 in a manner similar to that described for the precedent implementation; however, in this case the sliding members 18 have a reduced ability to move in a vertical direction.

The aiming glasses provided with the sliding members 18 are used as follows.

An athlete puts on the glasses, assumes a stance for aiming, specific to the particular sport, in front of an external aiming guide of any type—ref. to RU 2737350, Claims, Claim 10—disposed at a distance. The athlete then looks at an external point of the external aiming guide, then, with his/her hand, moves, for example, a lower sliding member 18 until the end of a line on the sliding member 18, which line serves as the center 12 of the aiming guides, is aligned with the external point on the external aiming guide and the visual axis 4, and then orients the line on the lower sliding member 18 along the vertical line of the external aiming guide. Then the athlete, with his/her hand, moves an upper sliding member 18 until its line is aligned with the vertical line on the external aiming guide above the line on the lower sliding member 18. Moreover, the sliding members 18 may be brought together or, at the athlete's discretion, any gap of up to 25 mm may be left to establish a line 8 of aim in various conditions: with a continuous vertical line or, in a more complex variant, with a gap in the vertical line.

Moreover, the athlete sees or imagines the center of the aiming guides at the line 8 of aim origin on the visual axis 4, and may establish a vertical aiming plane based on the lines on the sliding members 18.

In this way, the above main technical results and, following long-term training, the above further technical result can be achieved.

Figure 8:
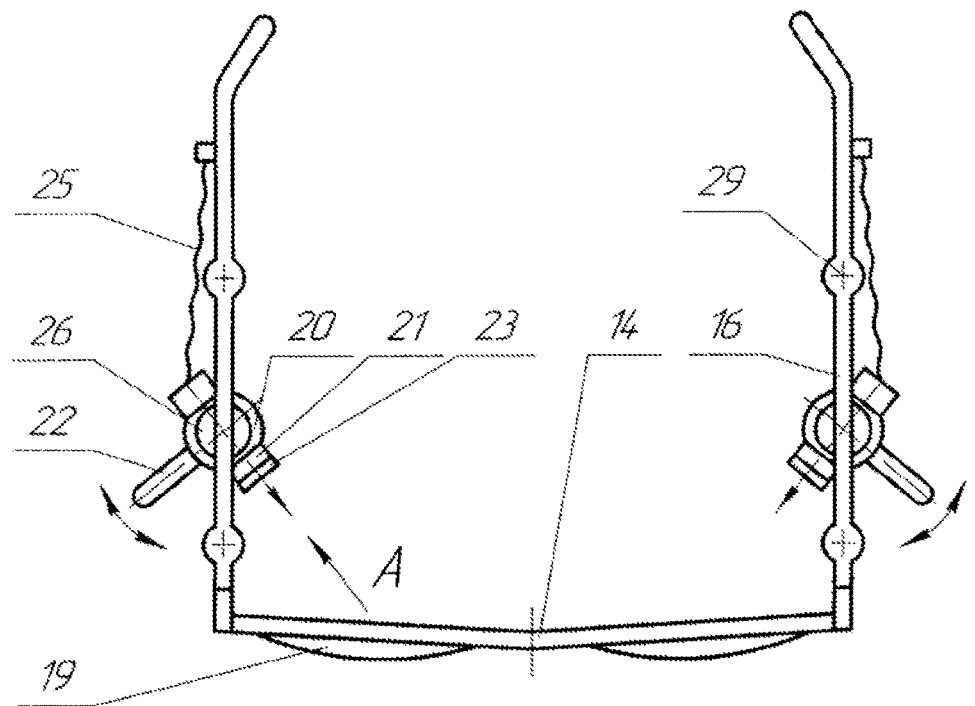
FIG. 8 shows an implementation of the aiming glasses, wherein 'the optical part is configured in the form of movable and rotatable luminous aiming guides on non-movable lenses', top view, scale 1:1.5.
Figure 9:
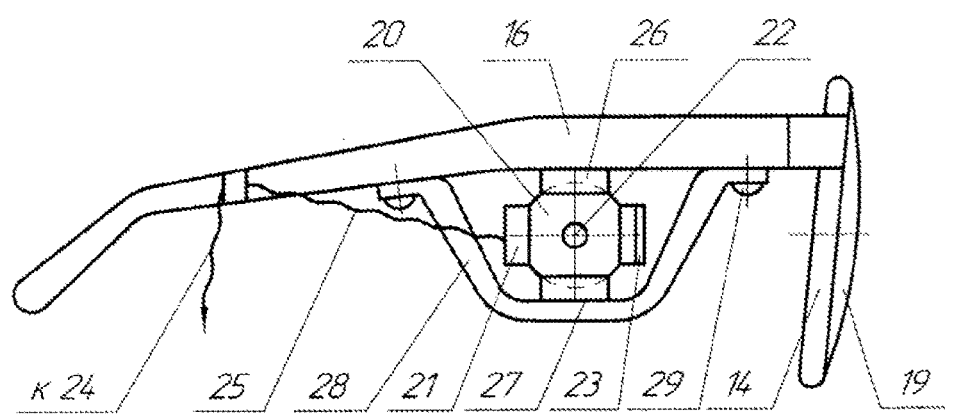
FIG. 9 shows the same with the light emitter rotated, left side view, scale 1:1.
Figure 10:
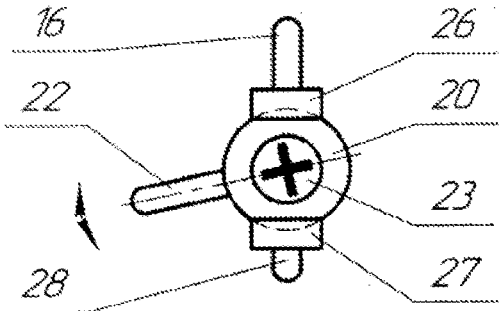
FIG. 10 shows the same with the light emitter tilted, a view indicated by Arrow A, scale 1:1.

In an implementation of the essential feature 'the optical part is configured in the form of movable and rotatable luminous aiming guides on non-movable lenses', as shown in FIGS. 8, 9, 10, the aiming glasses comprise non-movable standard dioptric or non-dioptric lenses 19 which are uncoated or provided with a polarizing coating, or with an anti-glare coating on the outer or the inner surface, or are darkened to have a translucency of, for example, 95 percent to provide contrast with the luminous aiming guides on the surfaces of the lenses 19 depending on the environmental conditions, e.g., lighting conditions. Similar coatings may be provided on the lens 10. The most preferable coating is determined by experiments. The glasses comprise a frame 14 having arms 16, the arms 16 having disposed therein movable and rotatable light emitters 20 producing, on the lenses 19, luminous aiming guides in the form, for example, of a luminous aiming reticle 11. Moreover, the luminous aiming guides may be produced in red, or blue, or other color with various concentrations and distinguishability of the lines on the lens 19 as necessary for athletes having different levels of competence. Thus, light rays from the target pass the aiming reticle 11 lines as a result of them being semi-transparent and as a result of diffraction.

The light emitter 20 is configured similar to that disclosed in the flashlight circuit at www.svetilov.ru: electrical, light emitting diode-based, mains chargeable.

The light emitter 20 comprises a cylindrical body 21 having the diameter of 10 mm and the length of 24 mm. The cylindrical body 21 has disposed therein standard parts (not shown in the figure): a light source in the form, for example, of a light emitting diode for a pendant flashlight—ref. to a www.sysetodiodinfo.ru, *Kharakteristiki svetodiodov dlya fonarikov, Kakiye diody ispolzuyutsya dlya fonarikov* (*Flashlight Light Emitting Diode Specifications, What Diodes are Used in Flashlights?*), para. 3, 4. The light emitting diode is 5 mm is size, has a current consumption of 20 to 50 mA, a voltage of 3.2 to 3.4 V. and a candlepower of 800 mcd. A current limiting resistor and a reflector for light guidance and concentration are also disposed in the body.

The central portion of the cylindrical body 21 outer surface is provided with a boss in the form of a sphere 18 mm in diameter to co-operate with the other parts of a Hooke's joint and with a handle 22 to move and rotate the light emitter 20.

There is provided, at the light emitter outlet, a confusor 23 having, for example, an X-shaped slot of a 0.5 to 1 mm width to produce luminous aiming guides in the form of an aiming reticle 11 on the lens 19 and to reduce the thickness of the luminous lines. Moreover, a short distance of 40 to 50 mm from the confusor 23 to the lens 19 ensures minimal diffusion of the luminous aiming reticle 11. The confusor 23 may be provided with a lens in red, blue or other color (not shown in the figures).

A power supply unit 24 includes an AAAA-type battery or a storage battery and is disposed outside the light emitter 20 on the arm 16 and screw-attached, or in the athlete's chest pocket, or on his/her belt depending on the storage battery weight and dimensions, is connected, via electric wires 25, to the light emitter 20 having an ON/OFF button (not shown).

The most preferable properties of all parts of the light emitter 20, such as the distance from the confusor 23 to the lens 19, are defined more precisely by experiments.

A mechanism for moving and rotating the light emitter 20 and the luminous aiming guides on the lenses 19 of the glasses is configured in the form of a ball-and-socket Hooke's joint—ref. to www.drive2.ru *Remont sharnira Guka (Hooke's Joint Repair)*—Jeep Cherokee, 4.0 1, 1993. Moreover, with the body's 21 Hooke's joint having the ball diameter of 18 mm disposed on the arms 16, no obstacles are created for the athlete's face or vision.

The Hooke's joint comprises an upper supporting structure 26 comprising a spherical inner surface having pasted thereto a liner (not shown in the figure), made of rubber, with a thickness of 1 to 1.2 mm, intended to contact with the spherical outer surface of the body 21, the supporting structure 26 being coupled to the arm 16. It further comprises a lower supporting structure 27 comprising a spherical inner surface and having pasted thereto a rubber liner, the supporting structure 27 being coupled to an additional arm 28, for example, during the plastic material molding; the additional arm 28 is attached to the arm 16 by means of screws 29, the arm 16 being provided with bosses for the screws 29. The force necessary for compressing the light emitter 20 body 21 spherical outer surface by the upper supporting structure 26 and the lower supporting structure 27 is ensured by selecting the necessary elasticity and thickness of the rubber for the pasted liners. Moreover, the light emitter 20 must be securely held stationary, while being easily movable and rotatable by the action of the athlete's fingers on the handle 22.

The aiming glasses provided with luminous aiming guides on non-movable lenses are used as follows.

An athlete puts on the glasses, assumes a stance for aiming in front of an external aiming guide of any type—ref. to RU 2737350, Claims, Claim 10—disposed at a distance. The athlete then looks at an external point of the external aiming guide and, for example, with his/her left hand for his/her left eye, moves and rotates, via the handle 22, the light emitter 20 until the center 12 of the luminous aiming reticle 11 is aligned with the center of the pit 3 in the yellow spot 2 and the external point on the external aiming guide, and vertically orients the aiming reticle 11. The athlete then may take a real aim and, for example, fire a shot.

In this way, the above main technical results and, following long-term training, the above further technical result can be achieved.

The above details, therefore, demonstrate that 'the aiming glasses' are intended for establishing a line of aim, including aligning the center of the aiming guides with the center of the pit in the eye yellow spot and the target, including orienting the aiming guides in the vertical plane, in all implementations of the essential features and demonstrate that they may be practiced such as to provide said technical results, including said further technical result.

What is claimed is:

1. Aiming glasses, comprising an optical part having aiming guides and a frame, wherein the optical part is configured in the form of movable and rotatable luminous aiming guides on non-movable lenses so as to enable determining the disposition of the center of a pit in an eye yellow spot and that of the visual axis origin inside the eye and aligning the center of a visible aiming reticle on the lenses and its visible vertical line passing throughout the lens and throughout the eye's field of vision with the center of the pit in the eye yellow spot and a target, and to enable to subsequently checking of the disposition of the external aiming guides with respect to the center of the aiming reticle, its vertical line and the target, the aiming reticle being disposed on the lenses at a distance shorter than the eye focal distance, the luminous aiming guides being configured in the form of an aiming reticle and produced by movable and rotatable light emitters disposed on the arms of the glasses, wherein the light emitter movement and rotation device is configured in the form of a Hooke's joint.

2. Aiming glasses, comprising an optical part having aiming guides and a frame, wherein the optical part is configured to be moved and rotated relative to the frame in order to align the center of the aiming guides with the eye visual axis passing through the center of a pit in an eye yellow spot and a target, and to vertically orient the aiming guides, wherein the optical part is configured in the form of movable and rotatable lenses provided with aiming guides, and the aiming guides are configured in the form of an aiming reticle on the lens or an X-shaped slot in the lens.

3. The aiming glasses of claim 2, wherein the frame is provided with grooves for lens movement and rotation.

4. The aiming glasses of claim 2, wherein the movable and rotatable lenses and the frame are provided with magnets.

5. Aiming glasses, comprising an optical part having aiming guides and a frame, wherein the optical part is configured to be moved and rotated relative to the frame in order to align the center of the aiming guides with the eye visual axis passing through the center of a pit in an eye yellow spot and a target, and to vertically orient the aiming guides, wherein the optical part is configured in the form of movable and rotatable sliding members provided with aiming guides configured in the form of lines.

6. The aiming glasses of claim 5, wherein the frame is provided with grooves for sliding member movement and rotation.

* * * * *